United States Patent [19]

Löbach

[11] 4,172,581
[45] Oct. 30, 1979

[54] VACUUM METERING VALVE CONSTRUCTION

[75] Inventor: Ernst Löbach, Eschen, Liechtenstein

[73] Assignee: Balzers Patent- und Beteiligungs-Aktiengesellschaft, Liechtenstein

[21] Appl. No.: 723,245

[22] Filed: Sep. 15, 1976

[30] Foreign Application Priority Data

Sep. 17, 1976 [CH] Switzerland ............... 012067/76

[51] Int. Cl.² ............................................. F16K 31/05
[52] U.S. Cl. ........................................ 251/11; 236/68 R
[58] Field of Search ........................ 251/11; 236/68 R

[56] References Cited

U.S. PATENT DOCUMENTS

| 2,373,324 | 4/1945 | Martin | 251/11 X |
| 3,050,601 | 8/1962 | Bohn | 236/68 R |
| 3,298,658 | 1/1967 | Alyea | 251/11 |
| 4,053,136 | 10/1977 | Perl | 236/68 R |

*Primary Examiner*—Arnold Rosenthal
*Attorney, Agent, or Firm*—McGlew and Tuttle

[57] ABSTRACT

A vacuum metering valve comprises a housing having an inlet and a discharge space from the inlet with a flow passage between the inlet and outlet having a valve seat with a valve member which is mounted in the housing for movement toward and away from the seat. The construction includes mechanical means for adjusting the position of the valve member in relation to the seat and in addition temperature control means are provided for varying the position in reference to the seat in accordance with temperature variations. Temperature variations are produced by suitable means for heating and cooling an auxiliary member which is disposed for example between a mechanical adjustment device and the valve member.

6 Claims, 4 Drawing Figures

VACUUM METERING VALVE CONSTRUCTION

BACKGROUND OF THE INVENTION

1. Field of the Invention

This invention relates in general to the construction of valves and in particular to a new and useful vacuum metering valve which includes a mechanical adjustment for setting a valve member in relation to a valve seat and which has means associated therewith for varying the position of the valve member in relation to the seat by varying the temperature or in accordance with the temperature variations.

2. Description of the Prior Art

Vacuum metering valves are needed in the vacuum technique for many purposes, particularly in two applications:

A. Where it is necessary, in a vacuum process, to continuously supply an exactly metered quantity of a precipitating gaseous reagent, for example, in a reactive deposition of thin layers, in this case, the valve is adjusted to a predetermined conducting valve; and B. In connection with closed-loop control devices for keeping the pressure constant in a vacuum space which is continuously evacuated and simultaneously continuously supplied, through the valve, with exactly the same amount of gas in order to maintain the predetermined pressure.

Valves for these purposes are frequently designed as so-called "needle valves" which, however, have the disadvantage that a sticking (cold welding) easily occurs between the needle tip serving as the closing member and the valve seat. Since in a needle valve, the passage opening is small, it may also easily become clogged with dirt.

That is why, recently, another construction has been used more often in which a valve plate of a hard material, for example, sapphire, is pressed against a valve seat designed as a knifeedge of softer material, for example, copper. Such valves can be better cleaned, have a longer life and may be made heatable in which case temperatures up to 450° C. are used in order to obtain a secure degassing of all parts coming into contact with the vacuum, which is important particularly in high vacuum applications. In such valves, however, while closed, so strong forces may be produced between the valve closing member and the valve seat, due to the unequal thermal expansion, particularly, of the housing and the valve rod, that the sealing edge is deformed excessively and the valve is either completely destroyed or at least its life is shortened. To avoid such consequences, devices for compensating the expansion have already been provided to counteract the occurrence of too strong forces by an elastic deformation of individual component parts of the valve, for example, resilient valve disks. Such special constructions are expensive and in addition, the drawback is always present that the passage opening of the valve, which, for metering the gas supply, is adjusted to a predetermined conducting value, also varies with the variation of the ambient temperature so that repeated readjustments are necessary and, moreover, a separate calibration is needed for the valve for every temperature.

Another disadvantage of all known metering valves to be adjusted by means of a screw or another mechanical or electromagnetic mechanism is that they must be manufactured with the highest precision in order to permit a sufficiently exact adjustment of the gas passage, particularly with small rates of flow.

Further known are gas metering valves in which a closing member is received in a tube, and tube and closing member are made of materials having unequal thermal coefficients of expansion. The opening or a change of the conducting value is effected so that upon heating the whole arrangement, the narrow gap between the closing member and the inside surface of the tube varies as a result of the unequal expansion of these two parts. In such cases, however, temperatures up to several 100° C. must be used and the device has a further disadvantage in that because of the thermal capacity of the parts to be heated, each adjustment to a definite gas conducting value is accomplished only in short increments so that such thermal metering valves can hardly be employed for closed-loop pressure control devices.

Also known are valves for liquids in which the thermal expansion of the volume of an elastic hollow body filled with liquid or gas and connected to a heating device, is used for the flow control. Such valves are used, for example, in heating installations. Bimetal-controlled devices for the flow control in lines are also known.

SUMMARY OF THE INVENTION

The present invention is directed to a vacuum metering valve which is simple in manufacture and, in spite of that, makes it possible to obtain a high accuracy and reproducibility of the gas metering.

The invention provides a vacuum valve in which a thermally controllable fine adjustment can be superimposed upon a mechanical pre-adjustment to a definite conducting valve and this thermal adjustment can be effected rapidly without requiring extensive temperature variations.

For this purpose, in accordance with the invention, a vacuum metering valve, comprising a valve housing with a gas inlet and a gas outlet, a valve seat mounted therein, a valve closing body, and a drive member for the valve closing body which is associated with an actuating member, is provided, in addition, with an auxiliary body and a means for adjusting the temperature of the auxiliary body, which are connected to the actuating member and the drive member in a manner such that the temperature dependent variations in length of the auxiliary body are transferred to the drive member.

Preferably, the means for adjusting the temperature is designed as a heating means, however, variations in length and, thereby, a fine motion of the valve closing body may be obtained also by cooling the valve lifting rod to a temperature below tbe ambient temperature.

In the inventive valve comprising the additional means for a thermal control of the valve passage, it is further possible to make the lifting rod and the valve housing of materials having approximately the same coefficient of thermal expansion which offers the advantage that the valve can be heated without thereby changing the adjusted gas conducting value. In particular, in such a case, the hermetically closed valve remains hermetic also after being heated up. As compared thereto, all thermally controlled valves of the prior art are based on the unequal thermal expansion of the component parts mzde of different materials.

It is an object of the invention to provide a valve member which is mechanically adjustable and which also includes temperature control means associated therewith for varying the position of the valve member in respect to the valve seat by changes in temperature which for example are produced by the temperature control means.

A further object of the invention is to provide a vacuum metering valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
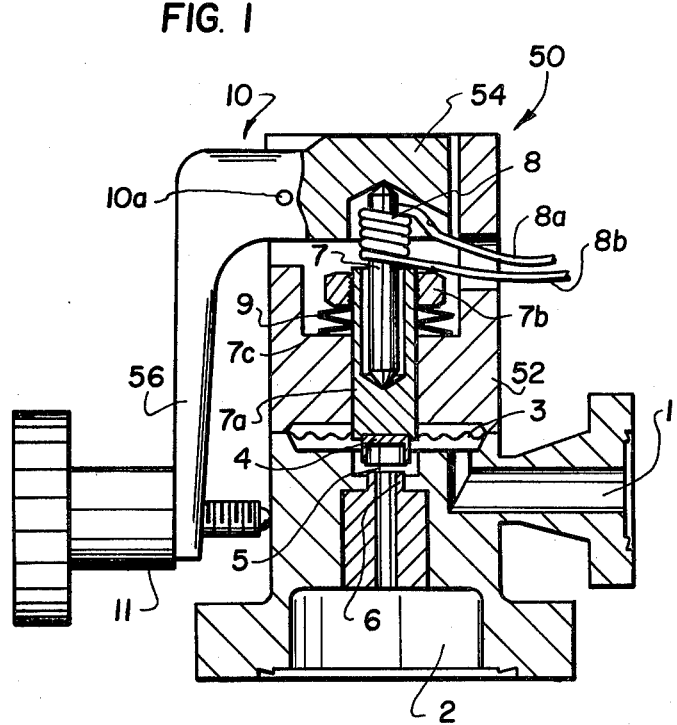
FIG. 1 is a transverse sectional view of a metering valve constructed in accordance with the invention.

Referring to the drawing in particular, the invention embodied therein comprises a valve generally designated 50 which includes a valve housing 52 having an inlet 1 which is spaced from an outlet 2 and which includes a valve seat 6 defined in the housing and a flow passage between the inlet and the outlet. The valve member or valve closing body 4 is adapted to be positioned in selective spaced relationship to the seat 6 for regulating the flow therethrough.

Mechanical means are provided for adjusting the position of the valve closing body 4 and this includes a drive member 7a which is mounted for axial displacement in the upper part of the valve housing and which may be displaced by a lifting rod member 7 which is disposed in an upper cavity of the drive member and which is moved by an actuator generally designated 10. The actuator 10 comprises a double armed lever which is pivoted at 10a and which includes a first arm portion 54 having a concave bottom face which receives the upper end of the lifting rod member 7. A second arm portion 56 provided with a bore therethrough for an adjusting screw 11 which bears against a side of the housing and which may be threaded in the bore of the arm 56 in order to vary the position of the arm and thus the position of the arm portion 54 and the lifting rod 7 and the drive member 7a and the valve closing body 4 in relation to the seat 6.

In the construction shown a nut 7b is threaded to the exterior of the drive member 7 and a compression spring 9 is disposed between the nut 7b and a recessed surface of the housing 52. The nut 7b may be rotated to vary the position of the drive member in relation to the valve seat 6. In addition the adjusting screw 11 may be adjusted in order to vary the position of the valve closing body 4 in relation to the seat. The valve closing body is actuated by means of a drive member 7a which is mounted for axial displacement in the housing.

In accordance with the invention auxiliary means 8 which comprises temperature control means or temperature regulating means comprise a temperature control coil which is wound around the upper part of the lifting rod 7 and is connected by terminal ends 8a or 8b to suitable means for either increasing or decreasing the temperature such as means for conducting a medium through the element for either heating or cooling the lifting rod 7 or means for electrically heating the rod.

In the embodiment of FIG. 1 the auxiliary body 7 comprises a thrust bolt that is a force transmitting intermediate member between the actuating member 10 and the drive member 7a. The upper end of the drive member or lifting rod 7a carries a nut 7b which is adjustable on a thread for varying the position thereof. In operation first the valve is adjusted to a predetermined passage as indicated in FIG. 1 which in the event that the temperature control means 8 comprises a heater corresponds to the maximum gas conducting value desired in the respective application. This is done by turning the adjustment screw 11 so that by means of the lever 10 the thrust bolt 7 is pressed against the drive member 7a and the valve closing body 4 is moved toward the valve seat 6 against the action of the compression spring 9. In the more accurate adjustment of the valve to a conducting value which is smaller than the maximum value can be effected by a thermal heating control. In any event, heating the thrust bolt 7 will cause the valve closing body 4 to move toward the valve seat and cooling the thrust bolt will cause it to move away from the valve seat. This makes possible the very accurate fine adjustment at a relatively small temperature variation up to 50° C. are sufficient for this purpose. In particular if the temperature control means is designed as electrical heating or cooling means for example by using Peltier elements, the inventive valve is suitable for mounting in a closed loop control circuit in which case the temperature of auxiliary body 7 is automatically adjusted so that the pressure in the recipient connected to the outlet 2 is kept constant or follows a predetermined program. With a manual adjustment of the temperature the inventive valve has the great advantage that to a mechanical preadjustment which is accurate in itself a thermal fine adjustment of still finer accuracy is superimposed.

Figure 2:
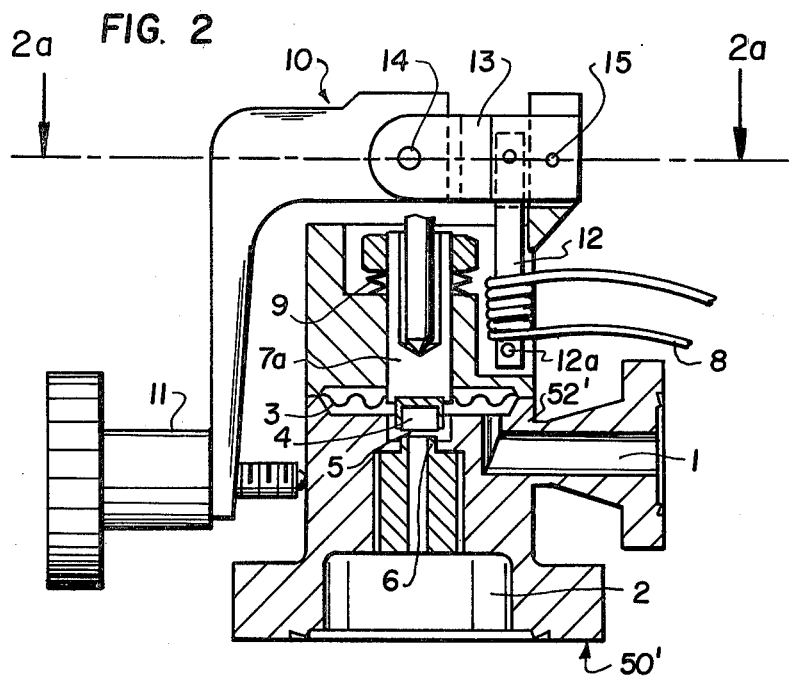
FIG. 2 is a view similar to FIG. 1 of another embodiment of the invention.
Figure 2A:
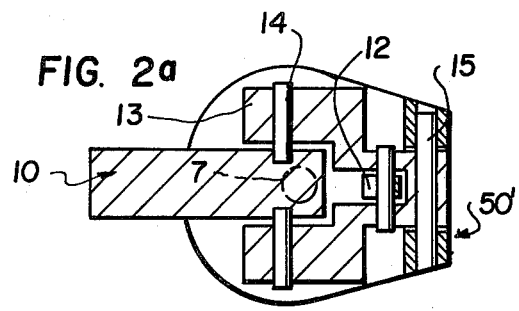
FIG. 2a is a section taken along the line 2a—2a of FIG. 2.

In the embodiment shown in FIG. 2 similar parts are similarly designated for a valve generally designated 50'. The principal of operation of the valve shown in FIGS. 2 and 2a is similar to that of FIG. 1 but the following differences are present: a separate auxiliary body 12 with associated temperature adjusting means is provided and temperature dependent variations in length of this body are transmitted to lifting rod 7 and from the lifting rod 7 to the drive hammer 7a by means of a forked lever 13 as shown in FIG. 2a. The forked lever is pivoted to the valve housing at 15. The lever of the actuating member 10 in this case is pivotally mounted at 14 to the forked lever 13 and thus the position of the pivotal point 14 is influenced by the temperature dependent variations in length of the auxiliary body 12 and the thermally controlled motion in this manner is superimposed to the motion which is mechanically controlled by lever 10 or by the adjusting screw 11. As soon as auxiliary body 12 which is secured to the valve housing by its lower end at 12a is heated, the pivotal point 14 as is evident from the drawing will be lifted under the action of the compression spring 9 and the valve will be opened to a greater extent. With contraction of the auxiliary body 12 upon cooling the valve is moved in a closing direction.

Figure 3:
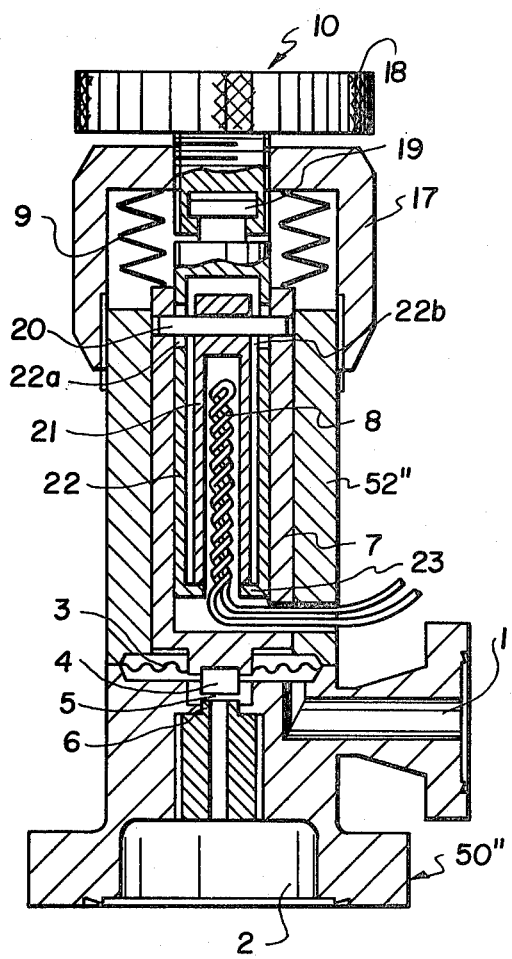
FIG. 3 is a view similar to FIG. 1 of another embodiment of the invention.

The embodiment of FIG. 3 is again similar to that of FIG. 1 and 2 but in this case the actuating member comrises a rotary knob 18 which is displaceable in a head part 17 of the valve housing 52" in an axial direction by means of a threaded spindle. Valve lifting rod 7 or the drive member is biased by a compression spring 9 which bears against the head part 17. The drive member 7 is connected by means of a cross bolt 20 to the upper end of an auxiliary body 21 which can be heated or cooled by temperature control means 8. The lower end of the auxiliary body 21 is supported on a shoulder 23 of a tubular portion 22 of the actuating member 10. The tubular portion 22 is provided in its upper part with lateral openings 22a and 22b through which the bolt 20 extends and which are dimensioned so that a clearance is provided for the cross bolt 20 which corresponds to the maximum temperature dependent variations in length of the auxiliary body 21. The valve passage between the inlet 1 and the outlet 2 is coarsely adjusted by means of a mechanical actuating member 10 and a fine adjustment is effected thermally. Upon heating of the auxiliary body 21 the length thereof increases so that the cross bolt 20 causes the valve lifting rod 7 to be moved in the direction of a wider opening of the valve. Upon cooling the inverse movement takes place. In any case the closing pressure is determined by the action of spring 9. If for example the temperature control means 8 is interrupted while a valve is closed the following cooling down of auxiliary body 21 results only in the lifting of the lower end of the body from the shoulder 23. A destruction of the valve seat by an excessive closing pressure is thereby prevented.

While specific embodiments of the invention have been shown and described in detail to illustrate the application of the principles of the invention, it will be understood that the invention may be embodied otherwise without departing from such principles.

What is claimed is:

1. An adjustable setting normally open vacuum metering valve, comprising a housing having an inlet, a discharge spaced from said inlet, and a flow passage between said inlet and said discharge having a valve seat therein, a valve member mounted in said housing for movement toward and away from said valve seat, a lifting rod member operatively bearing against said valve member and being movable to permit movement of said valve member toward and away from said valve seat, mechanical adjustment means mounted on said housing and including an adjustment member bearing against said lifting rod member and movable to shift said lifting rod member with said valve member in respect to said valve seat to establish one position of said valve member relative to and away from said seat for course adjustment of the position thereof relative to said valve seat for a controlled flow therethrough, and temperature control means associated with said lifting rod member to vary the length of said lifting rod member and to cause it to move said valve member correspondingly and thereby effect an adjustment movement of said valve member in respect to said valve seat for changing the flow past said seat, said lifting rod member being disposed between said adjustment and said valve member.

2. A vacuum metering valve according to claim 1, wherein said adjustment means comprises a lever pivotally mounted on said housing having one-armed portion bearing against said lifting rod member and having an opposite arm portion, and an adjustment screw engaged with said opposite arm portion and bearing against said housing member and being threadable to adjust said pivoting lever relative to said housing member.

3. A vacuum metering valve according to claim 1, wherein said means for varying the temperature of said lifting rod member comprises means for heating said lifting rod member.

4. A vacuum metering device according to claim 1, wherein said valve member and said housing are of the same thermocoefficient of expansion.

5. An adjustable setting normally open vacuum metering valve, comprising a housing having an inlet, a discharge spaced from said inlet, and a flow passage between said inlet and said discharge having a valve seat therein, a valve member mounted in said housing for movement toward and away from said valve seat, a lifting rod member operatively bearing against said valve member and being movable to permit movement of said valve member toward and away from said valve seat, mechanical adjustment means mounted on said housing and including an adjustment member bearing against said lifting rod member and movable to shift said lifting rod member with said valve member in respect to said valve seat to establish one position of said valve member relative to and away from said seat for course adjustment of the position thereof relative to said valve seat for a controlled flow therethrough, and temperature control means associated with said lifting rod member to vary the length of said lifting rod member and to cause it to move said valve member correspondingly and thereby effect an adjustment movement of said valve member in respect to said valve seat for changing the flow past said seat, said lifting rod member being disposed between said adjustment and said valve member, said valve member including a drive member portion having an upper end with a recess thereon, said lifting rod member being disposed in said recess in engagement with said drive member, the exterior of said drive member being threaded, and a nut engaged on the threaded portion of said drive member and spring means urging said nut with said drive member in a direction away from said valve seat, said nut being adjustable to vary the force on said spring member.

6. A vacuum metering valve, according to claim 5, wherein said temperature control means includes a coil wound around said lifting rod member and means for circulating a temperature control medium through said coil.

* * * * *